United States Patent [19]

Fields

[11] 3,845,553
[45] Nov. 5, 1974

[54] CLAW CLIPPER
[76] Inventor: Harold E. Fields, 905-A W. Maple St., Milwaukee, Wis. 53204
[22] Filed: Mar. 5, 1973
[21] Appl. No.: 338,006

[52] U.S. Cl. .......... 30/29, 30/228, 30/272 A, 51/170 PT, 74/57
[51] Int. Cl... B26b 15/00, B24b 23/02, F16h 25/12
[58] Field of Search........... 30/29, 228, 241, 272 R, 30/272 A; 74/57; 73/19

[56] References Cited
UNITED STATES PATENTS

| | | | |
|---|---|---|---|
| 751,031 | 2/1904 | Wantz | 74/57 X |
| 1,933,722 | 11/1933 | Farrar | 74/57 |
| 2,955,354 | 10/1960 | Laing | 30/29 |
| 3,199,193 | 8/1965 | Norty | 30/228 |
| 3,707,970 | 1/1973 | Smirnov | 30/241 X |

Primary Examiner—Al Lawrence Smith
Assistant Examiner—Gary L. Smith
Attorney, Agent, or Firm—Wheeler, Morsell, House & Fuller

[57] ABSTRACT

A cutting plate having a cutting edge is slideably mounted on top of an anvil plate having an opening for receiving the end of a claw to be clipped. An adjustable stop allows quick insertion of the claw to a uniform, safe position. A reciprocal drive means moves the cutting edge over the opening in the anvil plate to clip the end of the claw and then moves the cutting edge to a position where it is spaced from the opening. The reciprocal drive means is driven by an electric motor and includes a drive pin which is manually moved endwise into the groove of a motor driven feed screw, is held in driving position by a snap detent, and is automatically forced out of the groove at the end of the feed screw. A spring returns the cutting plate to its rest position when the drive pin is forced out of the groove at the end of the feed screw. A final shaping tool may be secured to the motor shaft to shape and polish the claw.

7 Claims, 4 Drawing Figures

PATENTED NOV 5 1974
3,845,553
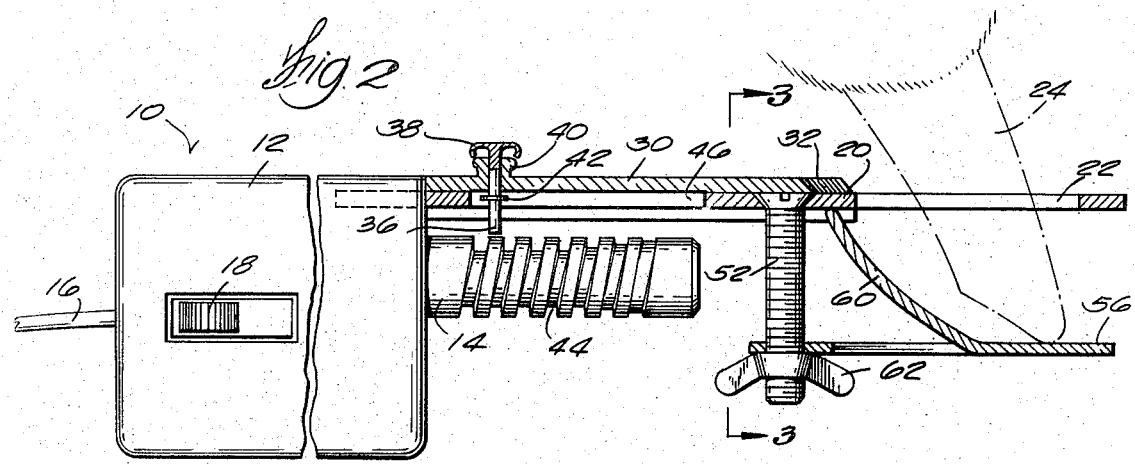
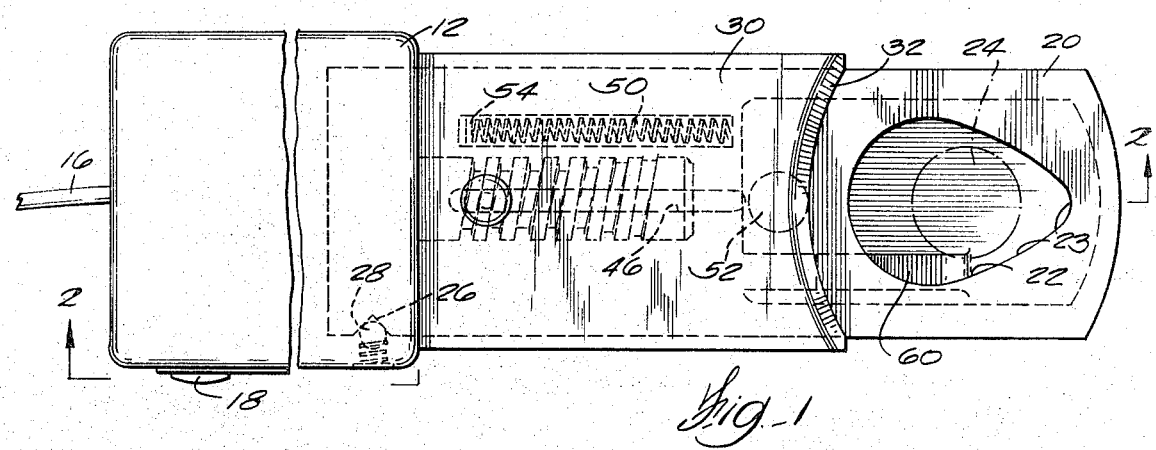
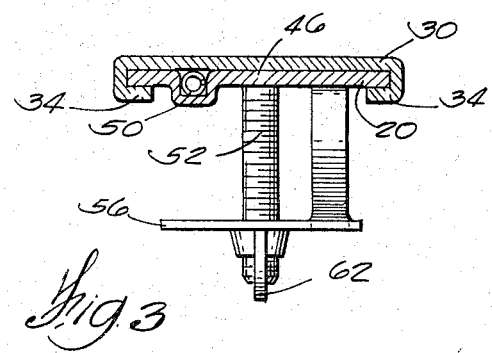
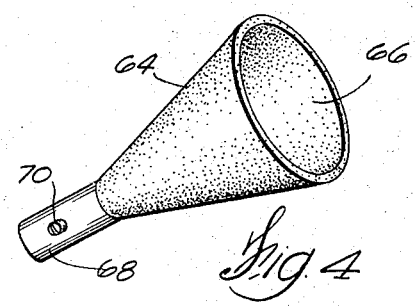

3,845,553

CLAW CLIPPER

BACKGROUND OF THE INVENTION

In the past it has been the practice to clip the claws of domestic pets with manually operated claw clippers. But this has proven to be unsatisfactory in cases where the animals are fidgety or where they are clipper shy from having been previously hurt or discomforted by claw clippers. The problem has been that the animal may move its paw at the start of a cutting stroke of the clippers and may cause either too much or too little of the claw to be clipped. Also, the animal may jerk its paw toward or away from the blade in the midst of a cutting stroke and spoil the cutting stroke and also cause itself pain. The latter condition may cause the animal to bite the person who is trying to clip its claws. Accordingly, it is desirable to provide a claw clipper which is fast enough and accurate enough in its cutting action to overcome this problem.

SUMMARY OF THE INVENTION

In accordance with this invention, the above noted problem is overcome by providing a claw clipper which is driven by an electric motor to provide a fast cutting action. The claw clipper of this invention includes a cutting plate having a cutting edge which is slideably mounted in channels on top of an anvil plate that has an opening for receiving the end of a claw to be clipped. A reciprocal drive means moves the cutting edge over the opening to clip the claw and then moves the cutting edge to a position where it is spaced from the opening. The reciprocal drive means is driven by an electric motor. In the preferred embodiment, the reciprocal drive means includes a drive pin which is manually snapped into the groove of a motor driven feed screw and is automatically forced out of the groove at the end of the feed screw, and a spring for returning the cutting plate to its rest position when the drive pin is forced out of the groove at the end of the feed screw. It is also preferable to place an adjustable claw rest under the opening in the anvil plate to automatically control the length of the end of the claw which is to be cut off.

The reciprocating mechanism is removable as a unit to make room for a final shaper and polisher to be secured to the motor shaft.

DESCRIPTION OF THE DRAWINGS

FIG. 1 is an enlarged top view of one illustrative embodiment of the invention.

FIG. 2 is a partial longitudinal sectional view taken on the line 2—2 of FIG. 1.

FIG. 3 is a cross-sectional view taken on the line 3—3 of FIG. 2.

FIG. 4 is a perspective view of a conical claw shaping tool which can be attached to the rotatable shaft for the claw clipper disclosed in FIGS. 1 - 3.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

FIGS. 1, 2 and 3 show an enlarged view of one illustrative embodiment of the invention. This embodiment includes an electric motor 10 which is mounted within a housing 12 and has a rotatable feed screw 14 projecting from the front of the housing 12. The feed screw 14 is rotated by the motor 10 and serves to drive the claw clipper mechanism as will be described hereinafter. In this particular embodiment, power to the electric motor 10 is furnished via an electric conductor 16, although it should be understood that this invention may also utilize battery driven motors or other rotary power sources if desired. The term motor as used herein includes any rotating power source. The motor 10 may be turned off and on by means of a switch 18 which is mounted on the outside of the motor housing 12. When the switch 18 is turned on, the feed screw 14 is rotated by the motor 10, and when the switch 18 is turned off, the feed screw 14 stops.

This embodiment also includes an avil plate 20 having an opening 22 formed therein for receiving the end of a claw 24 to be clipped. At its other end, the anvil plate 20 is removably secured to the housing. In this embodiment plate 20 is notched at 26 (see FIG. 1) and is removably held in a recess in the housing 12 by means of a spring loaded ball 28 which engages the notch 26 when the end of the anvil plate 20 is inserted therein. The anvil plate 20 may be easily inserted into and removed from the recess in the motor housing 12 for reasons that are discussed hereinafter.

A cutting plate 30 having a cutting edge 32 is slideably mounted in face contact with the anvil plate 20. In this particular embodiment snap the invention, the sides of the cutting plate 30 are bent over and around at 34 to form channels (see FIG. 3) so as to slideably embrace the Therefore, and underside of the anvil plate 20 and hold the cutting plate 30 in face contact with the anvil plate 34. FIGS. 1 and 2 show the normal or rest position of the cutting plate 30 relative to the anvil plate 20. When the end of a claw 24 is to be clipped with the device, the cutting plate 30 is slid to the right on the drawing so that the cutting edge 32 passes over the opening 22 and cuts through the end of the claw 24. This cutting movement of the cutting plate 30, and its subsequent return to the rest position shown in FIGS. 1 and 2, are produced by a reciprocal drive means, as described below.

In this particular embodiment of the invention, the reciprocal drive means includes a drive pin 36 (see FIG. 2) which is axially slideably mounted in an opening in the cutting plate 30. The pin 36 has one part of a snap fastener 38 formed on its upper end. The snap fastener 38 is engageable with a collar 40 that projects outwardly from cutter plate 30. A flange 42 is attached to the lower portion of pin 36 to prevent it from falling out of the opening in cutting plate 30. In its unsnapped condition, the pin 36 is just long enough to reach the outer periphery of the threads on the feed screw 14. When the sap end 38 of pin 36 is snapped down over collar 40, the end of pin 36 reaches to the bottom of the groove 44 in feed screw 14. THerefore, when the snap 38 is moved downwardly over its collar 40, pin 36 engages the groove 44 in feed screw 14 and is moved forwardly thereby. During its forward movement, the pin 36 rides in a slot 46 in anvil plate 20. At the end of the feed screw 14, the groove 44 becomes gradually shallower and terminates at 48 (see FIG. 2). Thus as the pin 36 approaches the end of the feed screw 14, it is automatically forced out of the groove 44 causing the snap 38 to disengage from its collar 40. This completes the cutting stroke of the cutting plate 30.

During the cutting stroke described above, a return spring 50 is compressed and the energy stored in the spring 50 is used to return the cutting plate 30 to rest position (not shown) in which pin 36 is over the unthreaded portion of feed screw 14 for safety. When it is desired to initiate a cutting stroke pin 36 is advanced manually to the position shown in FIGS. 1 and 2.

For easier, safer and surer engagement, the valley of the first thread may be broadened or otherwise shaped to receive the pin 36 more readily. The return spring 50 is mounted in a groove 52 in anvil plate 20 and is engaged at one end by the end of groove 52 and at the other by a lug 54 which extends downwardly from cutting plate 32. When cutting plate 32 is moved to the right over anvil plate 20 during the cutting stroke, the lug 54 bears against the end of spring 50 and causes it to compress. At the end of the cutting stroke, when the drive pin 36 is forced out of the groove 44 in feed screw 14, the energy stored in spring 50 moves the cutting plate 30 back to its rest position shown in FIGS. 1 and 2.

In the above described reciprocal drive mechanism, the drive pin 36 serves a dual function in that it is an essential part of the reciprocating drive mechanism and also serves as a clutch element for selectively engaging or disengaging the drive. The reciprocal drive mechanism can be selectively engaged for a single cycle of operation by manually depressing the snap end 38 of the pin 36 to cause the pin to engage in the groove 44 of the feed screw 14. As described above, the pin 36 is automatically forced out of the groove 44 at the end 48 thereof, which ends the cutting stroke and allows the cutting plate 30 to be returned to its rest position by the energy stored in spring 50. Thus the drive pin 36 and its snap end 38 and interacting collar 40 and the end 48 of groove 44 act as a single cycle clutch element. Because the snap is taken from beneath the finger of the user as the drive engages, multiple strokes which would cut the claw too short are not possible.

As best shown in FIG. 1, the opening 22 in anvil plate 20 is preferably tapered at 23 on the side away from the cutting edge 32 so as to provide edges for positioning the sides of the claws which range in size from relatively small to relatively large. The cutting edge 32 in this particular embodiment is curved, although a straight cutting edge or a V-shaped cutting edge could be used if desired.

In the preferred embodiment of the invention, a claw depth stop device is added to the claw clipper for automatically pre-determining the amount of claw to be clipped. This comprises a claw rest 56 (see FIG. 2) which is adjustably non-rotatably mounted on a bolt 58 that is non-rotatably attached to and projects below the anvil plate 20. Claw rest 56 is positioned below the opening 22 and is slideably secured to the bolt 58 by means of an opening therein (preferably non-circular) and is secured in an adjustable position along the bolt 58 by means of a leaf spring 60 and wing nut 62. By adjusting the wing nut 62, the claw rest 56 can be set to any desired spacing below the anvil plate 20 and thus set the amount of claw to be clipped. The spring 60 is stamped out of the material of claw rest 56 in such position as to not interfere with the claw 24. Although only one spring 60 is used in this embodiment, it will be apparent that two springs 60 could be utilized if desired, one on each side of claw rest 56, or the spring could be T-shaped to balance the forces.

In the operation of the device, the end of the claw 24 is inserted through the opening 22 as shown until it contacts the claw rest 56 and then the snap clutch mechanism is actuated to cause the clipping action to commence. The clipping action is extremely fast due to its motor driven cutting stroke, and therefore a fidgety animal will not move its claws between the start of the stroke and the end of the stroke. The exact time required for the cutting stroke is determined by the length of the cutting stroke, the rotary speed of the feed screw 14, and the pitch of the groove 44. The speed of motor 10 is selected to be fast enough to give the desired speed for the cutting stroke and to be slow enough to allow the drive pin 36 to be easily engaged in the groove 44 of feed screw 14, and also to operate claw shaping tools. A motor having a speed of 750 r.p.m. at the shaft is believed appropriate.

The anvil plate 20, cutting plate 30, and all of the parts supported thereby can be easily snapped out of the housing 12 to leave the feed screw 14 exposed for the purpose of clamping a conically shaped claw file, emery shaper, or buffer thereto (see FIG. 4). The conically shaped claw finishing tool 64 may have a hollow interior conical surface 66 of abrasive material which, when rotated, acts to trim the clipped claw to a curved end as the claw engages the side of the cone. The conical claw shaping tool 64 may be attached to the feed screw 44 by means of a hollow shank 68 which is dimensioned to cover the feed screw 14 and is held in position by a set screw 70. Although the size shown in FIG. 4 for the shank 68 appears to be smaller than the size shown in FIGS. 1 and 2 for the feed screw 14, the views shown in FIGS. 1 and 2 are scaled differently than the view shown in FIG. 4.

Although the above described embodiment of the invention is relatively small in size and is adapted to be used to trim the claws of household pets, it should be understood that the invention could be made in larger size if desired for trimming the claws of larger animals and also that the basic movement of this invention could also be utilized in other applications. Accordingly in the claims the work "workpiece," rather than "claw," is used to identify the object to be cut. This and other modifications of the disclosed structure will be apparent to those skilled in the art and this invention includes all modifications falling within the scope of the following claims.

I claim:

1. A clipper comprising an anvil plate having an opening therein for receiving the end of a workpiece to be clipped, a cutting plate slideably mounted in face contact with said anvil plate and having a cutting edge which faces the opening in said anvil plate, said cutting plate being reciprocably slideable with respect to said anvil plate to move said cutting edge across said opening in a cutting stroke to clip the end of said workpiece and then to move said cutting edge in a return stroke to a position in which it is spaced from said opening, an electric motor mounted in a housing, said anvil plate and siad cutting plate being attached to said motor housing, and reciprocal drive means between said electric motor and said cutting plate for reciprocally sliding the same including single-stroke clutch means for engaging and disengaging said reciprocal drive means, and means to return said cutting plate to its starting position automatically immediately upon disengagement of said single stroke clutch means.

2. A clipper as defined in claim 1 in which said reciprocal drive means comprises a helically channeled feed screw rotatably driven by said motor, a drive pin axially slideably attached to said cutting plate and axially engageable in the helical channel of said feed screw, said means for returning the cutting plate comprising spring means biasing said cutting plate to move in the direction of the return stroke whereby to cause said return stroke when said drive pin is released from said channel.

3. A clipper as defined in claim 2 in which said channel ends short of the end of said feed screw in a taper which joins the surface of the screw and said clutch means comprises snap means for holding said drive pin engaged in the channel of said feed screw until it is forced out of said channel at the end of said feed screw.

4. A clipper as defined in claim 1 and also including a claw rest plate movably attached spaced from and parallel to said anvil plate under said opening, and means for manually pre-setting the distance between said claw rest plate and said anvil plate.

5. A clipper as defined in claim 1 wherein said motor is detachable from said reciprocal drive means.

6. A clipper as defined in claim 1 wherein said anvil plate is detachably attached to said motor.

7. A clipper as defined in claim 1 wherein said opening in said anvil plate is tapered on the side away from said cutting edge.

* * * * *